United States Patent
Nishiura et al.

(10) Patent No.: US 6,943,498 B2
(45) Date of Patent: Sep. 13, 2005

(54) HIGH INTENSITY DISCHARGE LAMP AND HIGH INTENSITY DISCHARGE LAMP SYSTEM USING THE SAME

(75) Inventors: Yoshiharu Nishiura, Otsu (JP); Shigefumi Oda, Takatsuki (JP); Masanori Higashi, Takatsuki (JP); Shunsuke Kakisaka, Ibaraki (JP); Hiroshi Enami, Nishinomiya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/242,563

(22) Filed: Sep. 11, 2002

(65) Prior Publication Data

US 2003/0062832 A1 Apr. 3, 2003

(30) Foreign Application Priority Data

Sep. 14, 2001 (JP) ........................................ 2001-280062

(51) Int. Cl.⁷ .................... H01J 61/12; H05B 41/04
(52) U.S. Cl. .................... 313/568; 313/601; 313/643; 313/25; 315/73
(58) Field of Search ................... 313/572–574, 313/568, 567, 579, 637–643, 594, 601, 25, 576; 315/73–74, 362, 169.1, 24

(56) References Cited

U.S. PATENT DOCUMENTS

| | | | |
|---|---|---|---|
| 4,281,274 A | * | 7/1981 | Bechard et al. ............... 315/49 |
| 4,447,763 A | * | 5/1984 | Iyama et al. ................ 315/207 |
| 4,523,795 A | * | 6/1985 | Johnson et al. ............... 315/97 |
| 4,568,856 A |   | 2/1986 | Inoue et al. |
| 4,987,344 A | * | 1/1991 | Zaslavsky et al. ............ 315/59 |
| 6,069,456 A |   | 5/2000 | Fromm et al. |
| 6,300,716 B1 | * | 10/2001 | Honda ......................... 315/51 |
| 6,388,394 B1 |   | 5/2002 | Mita et al. |
| 6,563,268 B2 | * | 5/2003 | Yoshida et al. ............... 315/73 |
| 6,628,082 B2 | * | 9/2003 | Matsumoto et al. .......... 315/58 |

FOREIGN PATENT DOCUMENTS

| | | |
|---|---|---|
| EP | 1 107 285 | 6/2001 |
| JP | 55-91560 | 7/1980 |
| JP | 58-38448 | 5/1983 |
| JP | 63-190245 A | 8/1988 |
| JP | 64-14858 | 1/1989 |
| JP | 5-89849 | 4/1993 |
| JP | 10-172515 A | 6/1998 |
| JP | 2001-230092 A | 8/2001 |

* cited by examiner

Primary Examiner—Karabi Guharay
(74) Attorney, Agent, or Firm—Hamre, Schumann, Mueller & Larson, P.C.

(57) ABSTRACT

To provide a high-efficiency and long-life high intensity discharge lamp that is obtained by a configuration in which a neon gas or a neon-based gaseous mixture is filled as a starting-assistance rare gas for an alumina ceramic arc tube, and a filling pressure is set to 13 kPa or more. The high intensity discharge lamp is provided with the alumina ceramic arc tube having a discharge arc tube, alumina ceramic narrow tubes formed at both end portions of the discharge arc tube, electrodes and power feeders, the electrodes and the power feeders being arranged to form spaces in the narrow tubes. The discharge arc tube is filled with the neon gas or the neon-based gaseous mixture as the starting-assistance rare gas at a filling pressure of 13 kPa or more.

9 Claims, 7 Drawing Sheets

HIGH INTENSITY DISCHARGE LAMP AND HIGH INTENSITY DISCHARGE LAMP SYSTEM USING THE SAME

FIELD OF THE INVENTION

The present invention relates to a high intensity discharge lamp, and more particularly, to an arc tube configuration for a metal halide lamp having a ceramic arc tube composed of a polycrystalline alumina ceramic or the like.

BACKGROUND OF THE INVENTION

Recently, new-fashioned metal halide lamps have been developed. The metal halide lamps employ polycrystalline alumina ceramics in place of conventionally-used quartz as materials for arc tubes. The alumina ceramic arc tube allows the arc tube to have a higher bulb wall loading in a design due to high heat resistance as compared with a quartz arc tube, thereby realizing lamp properties of high efficiency and better color rendering.

As a conventional metal halide lamp, "a starter-containing lamp", i.e., a lamp with a built-in starter, has been developed mainly. It can be lit by a simple copper-iron type inductance ballast that is used in a high intensity mercury lamp or the like.

For example, the starter-containing lamp can be lit even when employing an already-existing ballast that is used in a high intensity mercury lamp. Therefore, a starter-containing metal halide lamp having a quartz arc tube can be used easily as a lamp system, and further, the total cost can be lowered. Therefore, such metal halide lamps have been used widely as lamps for general indoor and outdoor lighting. The lamps have a rated lamp life of 6000 hrs to 12000 hrs.

In contrast, lamps lit by a ballast with a pulse voltage-generating function dominate as a recent metal halide lamp having an alumina ceramic arc tube. At the present time, these lamps are used mainly for indoor lighting in commercial spaces like shops. The lamps have a rated lamp life of 6000 hrs or more.

FIGS. 4 and 5 show examples of typical arc tube configurations of conventional metal halide lamps having alumina ceramic tubes containing no starter. FIG. 6 shows the overall configuration of a lamp employing the arc tube shown in FIG. 4.

An arc tube 33 shown in FIG. 4 has an arc tube container 34. The arc tube container 34 is composed of a discharge arc tube 35 formed of a polycrystalline alumina ceramic and a pair of narrow tubes 36 and 37 that are sintered at both end portions of the discharge arc tube 35. In the discharge arc tube 35, a pair of tungsten coil electrodes 38 and 39 extend from both inner ends thereof. The tungsten coil electrodes 38 and 39 are composed of two components of the tungsten electrode rods 40 and 41 and tungsten coils 42 and 43, respectively.

In the narrow tubes 36 and 37, power feeders 44 and 45 formed of niobium or a conductive cermet are sealed airtight by frit 46. Further, each of the tungsten electrode rods 40 and 41 is welded to be held at one end of each of the power feeders 44 and 45. When the power feeders 44 and 45 are formed of a conductive cermet, an external lead wire formed of niobium or the like may be welded and held at the other end of each of the power feeders 44 and 45.

In this configuration, the narrow tubes 36 and 37 are not filled entirely with the frit 46, but the frit 46 is stopped in the vicinity of the welded portions at the ends of the tungsten electrode rods 40 and 41. This configuration is necessary and indispensable for avoiding erosion of the frit 46 caused by a luminescent material during lighting of the lamp and for preventing cracks and breakages from occurring in the case of sealing directly the tungsten electrode rods 40 and 41 with the frit. Further, it can be said that this configuration realizes the metal halide lamp having an alumina ceramic tube.

This configuration consequentially forms spaces 47 and 48 between the narrow tubes 36 and 37 and the tungsten electrode rods 40 and 41. In the spaces 47 and 48, molybdenum coils 49 and 50 are wound around the tungsten electrode rods 40 and 41, respectively.

FIG. 5 shows another example of the arc tube, in which the narrow tubes 36 and 37 are configured differently from those shown in FIG. 4. In the arc tube shown in FIG. 5, the power feeders 44 and 45 are formed of a conductive cermet that is not eroded by a metal halide as a luminescent material. Therefore, the power feeders 44 and 45 are extended toward the electrodes and the molybdenum coils 49 and 50 are not provided.

However, the frit 46 is filled at a rear portion of the narrow tubes 36 and 37 also in the arc tube configuration for the same reason as described with reference to the arc tube shown in FIG. 4. Accordingly, the spaces 47 and 48 are formed on the side near a discharge space between inner surfaces of the narrow tubes 36 and 37 and the power feeders 44 and 45, while theses spaces are narrower as compared with those shown in FIG. 1.

The arc tubes shown in FIGS. 4 and 5 are filled with a metal halide such as $DyI_3$, $TmI_3$, $HoI_3$, $TlI$ and $NaI$ as a luminescent material 51, mercury as a buffer gas, and a starting-assistance rare gas 52. As the starting-assistance rare gas 52 for the lamps containing no starter, argon Ar of 7 kPa or more but less than 13 kPa usually is used.

FIG. 6 shows an example of the overall configuration of a lamp having the arc tube 33 shown in FIG. 4. In a lamp 53 shown in FIG. 6, the arc tube 33 is provided in an outer bulb 54 formed of a quartz or a hard glass, and a lamp base 55 is fitted to the outer bulb 54. The outer bulb 54 is filled with a nitrogen-based gaseous mixture at a pressure of about 70 kPa. A shield quartz tube 56 for avoiding breakage in the outer bulb is provided around the arc tube 33.

FIG. 7 shows an example of a lighting circuit in which the copper-iron type inductance ballast is combined with the conventional starter-containing metal halide lamp having a quartz arc tube. A quartz arc tube 57 shown in FIG. 7 is provided with a pair of tungsten coils 58 and 59 at both ends thereof, and is attached to a tungsten auxiliary electrode 60 at one end portion thereof. The metal halide as a luminescent material 61 and the starting-assistance rare gas 62 are filled in the arc tube.

As the starting-assistance rare gas 62, argon (Ar) or a neon-argon penning gas (Ne and 0.1% to 2.0% Ar) of 7 kPa or more but less than 13 kPa usually is used. It should be noted that 0.1% to 2.0% Ar refers to a molar ratio or a pressure ratio of Ar. This can be applied to 0.5% Ar in a neon-argon penning gas (Ne and 0.5% Ar) as described below.

Use of the neon-argon penning gas provides Penning effect that metastable atoms of the main gas (Ne) excite or ionize the mixed gas (Ar). Ionization will lower the discharge-starting voltage and facilitate starting of the lamp.

In a completed lamp 63, the arc tube 57 is provided in a glass outer bulb 64. In the case where the neon-argon penning gas is used as the starting-assistance rare gas 62, a mixture of neon is filled at a pressure of about 70 kPa in the glass outer bulb 64 so as to prevent the neon gas from diffusing from the quartz arc tube 57 to the inside of the glass outer bulb 64.

A starter 65 is composed of a series circuit including a current switching element 66 formed by a glow starter or a nonlinear ceramic condenser, a current control resistor 67 and a bimetal switch 68. The series circuit is connected in parallel to the quartz arc tube 57.

During starting of the lamp, a high voltage pulse ranging from 1.5 kV to 2.0 kV is induced at a copper-iron type ballast 69 due to interruption of current caused by operations of the current switching element 66, thereby starting the quartz arc tube 57. The high voltage pulse for starting the arc tube is set to 2.0 kV or less so as to ensure a withstand voltage performance of the ballast that is used in a high intensity mercury lamp.

In order to widen the scope of the application of the metal halide lamp having an alumina ceramic tube and further advancing energy saving in the field of lighting equipment, the present inventors have pursued the research of developing more efficient metal halide lamps having alumina ceramic tubes. More specifically, the metal halide lamps can be used for conventional metal halide lamps having quartz arc tubes, which have been used widely for general indoor and outdoor lighting.

An object of the development is to develop a starter-containing metal halide lamp having an alumina ceramic tube. Such a metal halide lamp can be lit by a simple copper-iron type ballast used in a conventional high intensity mercury lamp or the like, having a rated lamp life of 6000 hrs or more.

In order to achieve the above-mentioned object, the present inventors aimed at employing a neon gas or a neon-based gaseous mixture having lower starting-operation voltage as the starting-assistance rare gas to be filled in the arc tube.

However, the experimental results showed that there arose a problem in a configuration in which the starter-containing metal halide lamp having an alumina ceramic tube was filled with the neon gas or the neon-based gaseous mixture as the starting-assistance rare gas. Specifically, in the configuration, the lamp life will be shortened due to cracks in the narrow tubes, while the starting-operation voltage was lowered. The details will be described at a later point in the specification.

SUMMARY OF THE INVENTION

Therefore, with the foregoing in mind, it is an object of the present invention to provide a high-efficiency and long-life high intensity discharge lamp that is obtained by a configuration in which a neon gas or a neon-based gaseous mixture is filled as a starting-assistance rare gas and the filling pressure is set to 13 kPa or more in a high intensity discharge lamp having an alumina ceramic arc tube.

In order to achieve the above-mentioned object, the present invention provides a high intensity discharge lamp including an alumina ceramic arc tube having a discharge arc tube, alumina ceramic narrow tubes formed at both end portions of the discharge arc tube, electrode rods and power feeders, the electrode rods and the power feeders being arranged to form spaces between the electrode rods, the power feeders and inner surfaces of the narrow tubes. In the high intensity discharge lamp, the alumina ceramic arc tube is arranged in an outer bulb, the outer bulb includes a starter therein, the discharge arc tube is filled with a neon gas or a neon-based gaseous mixture as a starting-assistance rare gas and a filling pressure is set to 13 kPa or more. In the high intensity discharge lamp, a discharge arc can be prevented from jumping from tip portions of the electrodes to the spaces formed by the electrode rods, the power feeders and the inner surfaces of the narrow tubes, during starting of the lamp, and also the occurrence of cracks and breakages in the narrow tubes can be avoided. Therefore, it is possible to offer the high intensity discharge lamp that is of high efficiency and can sustain a long life property of 6000 hrs while the starting-operation voltage is low.

Further, according to the above-mentioned configuration in which the starter is provided, the starting property can be improved. This promotes arc discharge from the tip portions of the electrodes after the discharging starts. Thus, discharging times in the narrow tubes can be shortened so as to prevent a local temperature rise. Therefore, the improved starting property serves also for preventing cracks and breakages in the narrow tubes, which results in the improved life property.

Further, since the starter is provided in the outer bulb, the high intensity discharge lamp can be lit even by a ballast having no pulse-generating function in itself.

The high intensity discharge lamp preferably is lit by being connected to a ballast having no pulse-generating function.

In the high intensity discharge lamp, it is preferable that the filling pressure is set to 15 kPa or more.

In the high intensity discharge lamp, it is preferable that the filling pressure is set to 20 kPa or more.

In the high intensity discharge lamp, it is preferable that the filling pressure is set to 30 kPa or more.

In the high intensity discharge lamp, a life property can be improved.

In the high intensity discharge lamp, it is preferable that neon-based gaseous mixture is a neon-argon penning gas.

In the high intensity discharge lamp, it is preferable that the alumina ceramic arc tube is arranged in the outer bulb, and the outer bulb is filled with a nitrogen gas therein.

In the high intensity discharge lamp, even when the arc tube leaks and then the neon gas in the arc tube diffuses to the outer bulb at the end of the lamp life, the gas concentration in the outer bulb can be kept to contain nitrogen mainly. Therefore, discharge between the components in the outer bulb can be avoided completely, which results in an enhanced safety.

In the high intensity discharge lamp, it is preferable that a starting-assistance conductor is provided along the discharge arc tube.

In order to achieve the above-mentioned object, the present invention provides a high intensity discharge lamp system provided with the high intensity discharge lamp, wherein the high intensity discharge lamp is lit by a ballast having no pulse-generating function.

DETAILED DESCRIPTION OF THE INVENTION

Embodiment

Figure 1:
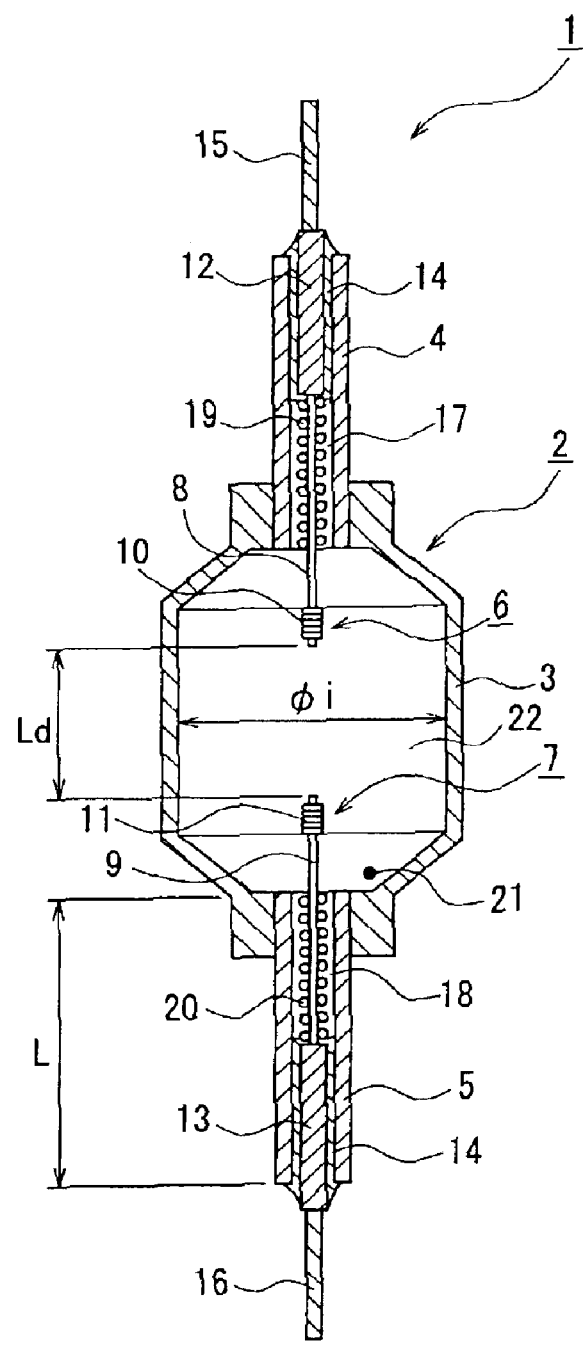
FIG. 1 is a cross-sectional view showing an arc tube of a metal halide lamp having an alumina ceramic tube according to an embodiment of the present invention.
Figure 2:
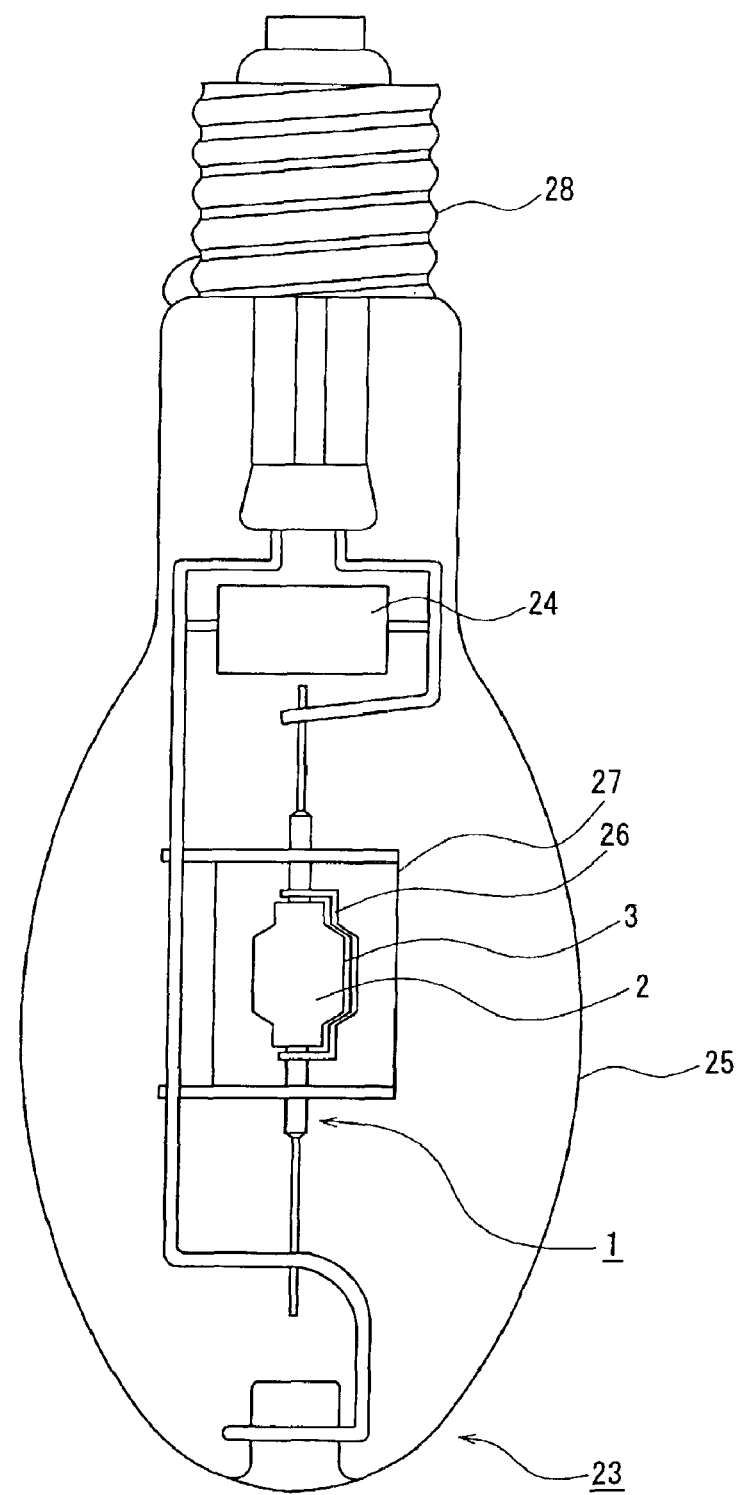
FIG. 2 is a view showing an overall configuration of a metal halide lamp having an alumina ceramic tube according to an embodiment of the present invention.
Figure 3:
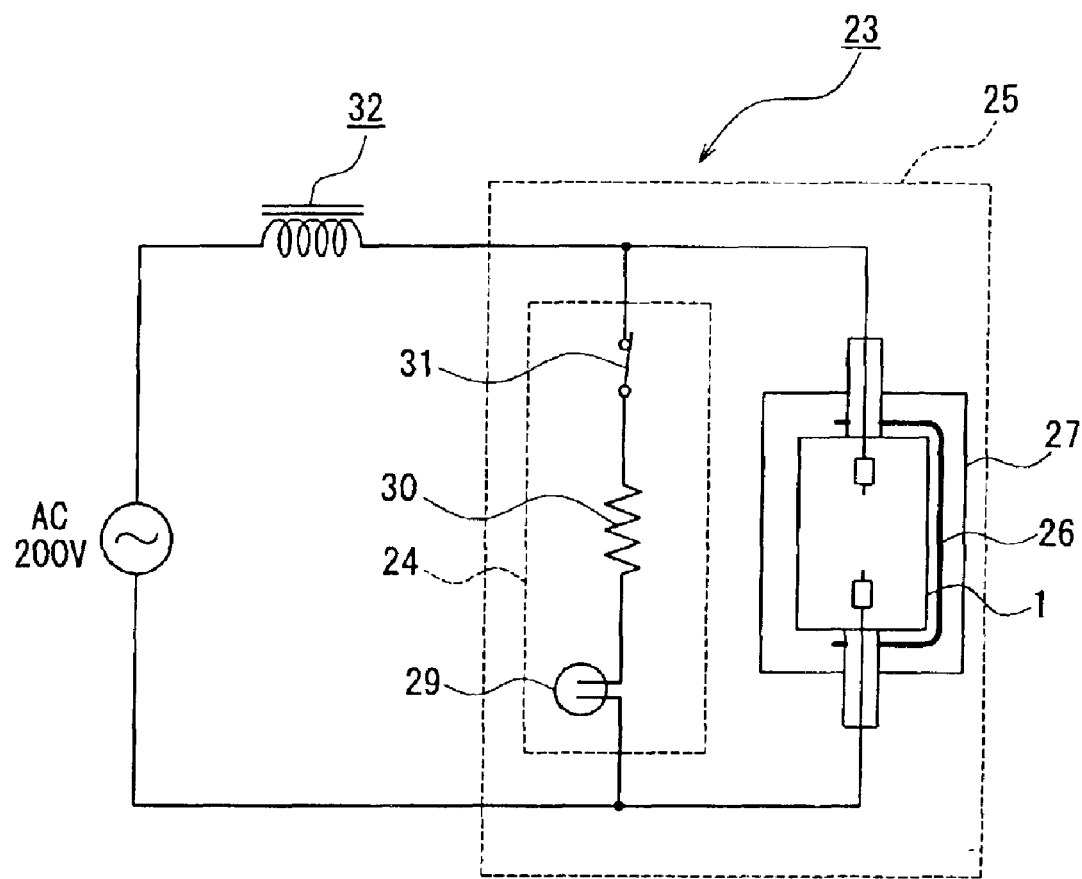
FIG. 3 is a view showing a lighting circuit configuration of a metal halide lamp having an alumina ceramic tube according to an embodiment of the present invention.

Hereinafter, an embodiment of the present invention will be described with reference to FIGS. 1 to 3. FIG. 1 is a cross-sectional view showing a 300 W metal halide lamp having an alumina ceramic tube according to an embodiment of the present invention. FIG. 2 is a view showing an overall configuration of a lamp provided with an arc tube shown in FIG. 1. FIG. 3 is a view showing an example of a lighting circuit of a lamp, in which a ballast is combined with the lamp shown in FIG. 2.

Figure 4:
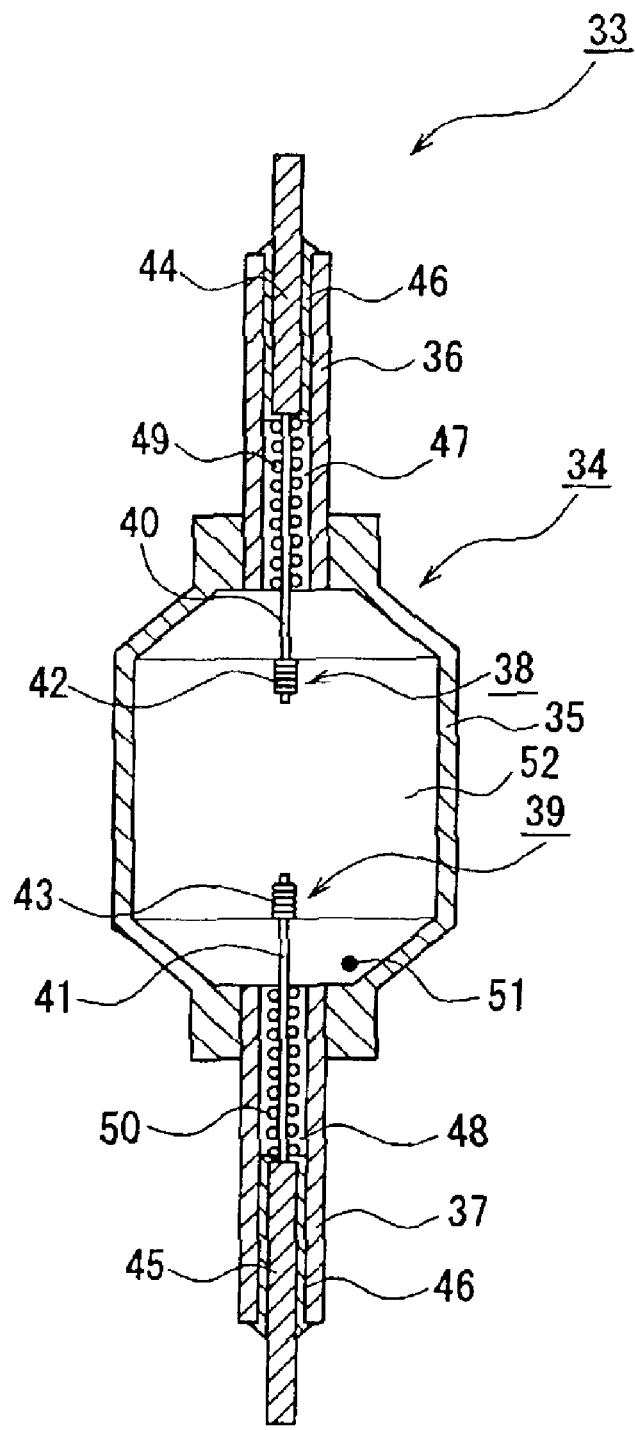
FIG. 4 is a cross-sectional view of an example of a conventional metal halide lamp having an alumina ceramic tube.

A basic configuration of an external appearance of an arc tube 1 shown in FIG. 1 is of the same as that of a conventional metal halide lamp having an alumina ceramic tube shown in FIG. 4. The arc tube 1 has an arc tube container 2. The arc tube container 2 is composed of a discharge arc tube 3 formed of a polycrystalline alumina ceramic and a pair of alumina ceramic narrow tubes 4 and 5 (referred to as "a narrow tube") that are sintered at both end portions of the discharge arc tube 3. At both ends of the discharge arc tube 3, a pair of tungsten coil electrodes 6 and 7 are provided.

In the present embodiment, an internal diameter (Øi) of the discharge arc tube 3 is set to 17.0 mm. An internal diameter of each of the narrow tubes 4 and 5 is set to 1.3 mm. A distance (Ld) between electrodes is set to 24.0 mm. The tungsten coil electrodes 6 and 7 are formed of two components of tungsten electrode rods 8 and 9 (a wire diameter of 0.7 mm) and tungsten coils 10 and 11 (a single wire diameter of 0.2 mm and a coil-winding number of 10 times), respectively.

Power feeders 12 and 13 (a diameter of 1.2 mm) are formed of a conductive cermet having a composition of 50% $Al_2O_3$ and 50% Mo. The power feeders 12 and 13 are sealed airtight in the narrow tubes 4 and 5 respectively by a frit 14 obtained by mixing $Dy_2O_3$, $Al_2O_3$ and $SiO_2$ based material.

Further, each of the power feeders 12 and 13 has one end to which each of the tungsten electrode rods 8 and 9 is welded and held, and each of external lead wires 15 and 16 (a wire diameter of 1.2 mm) formed of niobium is welded and held to the other end.

The frit 14 is melted to fill in the narrow tubes to a point in the vicinity of a welded end portion of each of the tungsten electrode rods 8 and 9. This configuration consequently forms spaces 17 and 18 between inner surfaces of the narrow tubes 4 and 5 and the tungsten electrode rods 8 and 9. In the spaces 17 and 18, molybdenum coils 19 and 20 (a wire diameter of 0.25 mm) are wound around the tungsten electrode rods 8 and 9, respectively.

The arc tube 1 is filled with 13.5 mg of a metal halide having a composition of 40 wt % $CeI_3$ and 60 wt % NaI as a luminescent material 21, 45 mg of mercury Hg as a buffer gas, and a neon gas Ne or a neon-argon penning gas (Ne and 0.5% Ar) having a low starting-operation voltage as a starting-assistance rare gas 22. The neon-argon penning gas is a mixture gas composed almost exclusively of neon.

FIG. 2 is a view showing an overall configuration of a lamp provided with the arc tube 1 shown in FIG. 1. In a lamp 23 shown in FIG. 2, the arc tube 1 is combined with a starter 24. The arc tube 1 is provided in an outer bulb 25 made of a hard glass. A starting-assistance conductor 26 formed of molybdenum wires is attached along the discharge arc tube 3 in the arc tube container 2 so as to lower the starting-operation voltage further.

The outer bulb 25 is filled with a nitrogen gas at a pressure of 70 kPa. A shield quartz tube 27 for avoiding breakage in the outer bulb is provided around the arc tube 1. In a completed lamp, a lamp base 28 is fitted to the outer bulb 25.

As shown in FIG. 3, in a schematic configuration of a lighting circuit, the starter 24 is composed of a series circuit including a current switching element 29 employing a glow starter, a current control resistor 30 and a bimetal switch 31. The series circuit is connected in parallel to the arc tube 1. During starting of the lamp, on-off operations of a contact of the current switching element 29 employing the glow starter cause interruption of current. Then, a high voltage pulse ranging from 1.5 kV to 2.0 kV is induced at a copper-iron type ballast 32 that is used in a 300 W type high intensity mercury lamp due to the interruption of current, thereby starting the arc tube 1. The high voltage pulse for starting the arc tube is set to 2.0 kV or less so as to ensure a withstand voltage performance of the ballast that is used in a high intensity mercury lamp.

The following description is directed to experimental results. Lamps used in the experiment were configured as shown in FIGS. 1 and 2. Initially, the Ne gas or the neon-argon penning gas (Ne and 0.5% Ar) was filled as the starting-assistance rare gas 22. The filling pressure was set to 10.5 kPa, which is a conventionally-employed normal value. Under this setting, the initial properties (lamp aging times of 100 hrs) were measured.

As a result, excellent lamp properties of a luminous flux of 36500 lm, a lamp efficiency of 121.71 m/W and an average color rendering index of Ra 72 was obtained with 300 W of lamp input. Further, it was confirmed also that the arc tube 1 is started with reliability by applying an induced high voltage pulse of 2.0 kV or less.

As for the above-mentioned lamp configuration, two lamps were prepared as comparative examples for the measurement of the starting properties. One of the lamps for comparison was filled with an Ar gas at a pressure of 10.5 kPa as the starting-assistance rare gas 22, instead of the Ne gas or the neon-argon penning gas (Ne and 0.5% Ar). The other lamp for comparison was not provided with the starting-assistance conductor 26. It was proved that the arc tube 1 in each of the comparative examples did not start reliably.

Next, the lamp filled with the neon-argon penning gas (Ne and 0.5% Ar) at a pressure of 10.5 kPa was subjected to a life test based on aging. The test results showed that the aging times beyond 1000 hrs led to the occurrence of cracks or breakages in the narrow tubes 4 and 5 at both end portions of the arc tube 1, and this shortened a lamp life. This phenomenon did not occur in the conventional lamp employing the argon Ar as the starting-assistance rare gas.

It was proved from the above-mentioned experimental results that as for the alumina ceramic arc tube having the starter and the starting-assistance conductor, a sample filled with the Ne gas or the neon-argon penning gas as the starting-assistance rare gas at a filling pressure of 10.5 kPa was excellent in both the lamp properties and the starting property. However, the sample had a shortened life due to the cracks or the breakages in the narrow tubes 4 and 5 at both the end portions of the arc tube 1.

Next, the phenomena of the cracks and the breakages in the narrow tubes 4 and 5 were checked. Then, it was observed that a discharge arc jumped from a tip portion to a bottom side in a rear portion of each of the tungsten electrode rods 8 and 9 at starting of the lamp that was subjected to aging beyond 1000 hrs. Further, it was confirmed also that the discharging caused damage to the tungsten electrode rods 8 and 9 and to the molybdenum coils 19 and 20 in the vicinity of a bottom of the electrodes in the arc tube 1 in which the cracks and the breakages occurred.

This reveals that a thermal shock is a direct factor that causes the cracks and the breakages in the narrow tubes 4 and 5. The thermal shock results from a jump of the discharge arc from tip portions of the electrodes to the molybdenum coils 19 and 20 in the spaces 17 and 18, respectively, or to the tungsten electrode rods 8 and 9 in the narrow tubes 4 and 5, respectively, during starting of the lamp.

Further, an indirect factor for causing the discharge arc to jump to the spaces 17 and 18 is considered as a combination of the following three factors. First, electrons and mercury ions produced in cathode regions of the tip portions of the electrodes basically tend to diffuse to the spaces 17 and 18 in the rear portion of the electrodes at the beginning of starting of the lamp more with the neon gas than the argon gas. Second, a so-called hollow effect accelerates the concentration of the discharge arc to the spaces 17 and 18. Third, outside diameters of the tungsten coils 10 and 11 of the electrodes are smaller somewhat than internal diameters of the narrow tubes 4 and 5.

Among the above factors, in particular, the hollow effect relates to an arc tube configuration peculiar to the starter-containing metal halide lamp having an alumina ceramic tube. Further, the jumping of the discharge arc occurs as the lamp aging times become long. This is considered to result from lowered electron-radiating capability at the tip portion of each of the electrodes.

In the above description, the configuration shown in FIG. 1 was employed. However, the cracks and the breakages occurred in the narrow tubes in a configuration shown in FIG. 5 even when the discharge arc jumped to the rear portion of the electrodes at starting of the lamp. In the configuration, the power feeders formed of the conductive cermet were extended to the side of a discharge space, and no molybdenum coils were provided.

In this case, it was observed that the jump of the discharge arc was concentrated especially to edges of the power feeders 12 and 13 in the vicinity of the spaces 17 and 18. This clarifies that the jump of the discharge arc relates to a presence of the spaces 17 and 18. Further, it was observed also that a heavy blackening of the arc tube occurred when molybdenum was evaporated from the conductive cermet serving as the power feeders 4 and 5, in addition to the cracks and the breakages in the narrow tubes 4 and 5.

The present inventors have made various kinds of investigations in order to prevent the cracks or the breakages from occurring. Particularly, various kinds of experiments were conducted regarding the filling pressure of the starting-assistance rare gas 22 from the viewpoint of preventing a starting failure. Conventionally, the upper limit of the filling pressure was set to a range of less than 13 kPa. However, this experiment was conducted at a filling pressure set to 13 kPa or more. It was found from the experimental results that a simple but secured and effective method was to raise the filling pressure of the neon gas or the neon-based gaseous mixture from a conventionally-set pressure value, that is, at least 7 kPa but less than 13 kPa.

The details will be described with reference to the experimental results. The following Table 1 shows the experimental results. Samples (No. 1 to No. 7) employed in the experiment were configured as shown in FIGS. 1 and 2. In the samples, the neon-argon penning gas (Ne and 0.5% Ar) was employed as the starting-assistance rare gas 22. The samples No. 2 to No. 7 were obtained by changing the filling pressure of the starting-assistance rare gas 22 in six levels in a range of 13 kPa to 40 kPa. 20 samples were prepared for the respective samples No. 2 to No. 7 and were checked to see if the cracks or the breakages occurred due to aging in the narrow tubes 4 and 5. The samples No. 1 were used for a comparison. 20 samples for the sample No. 1 had the filling pressure of the starting-assistance rare gas 22 set to 10.5 kPa and were checked in the same manner as in the other samples.

| | | aging | | | | | |
|---|---|---|---|---|---|---|---|
| No. | filling pressure | 1000 hrs | 3000 hrs | 6000 hrs | 9000 hrs | 12000 hrs | evaluation |
| 1 | 10.5 kPa | 0 | 2 | 3 | 4 | 6 | Defective |
| 2 | 13 kPa | 0 | 0 | 0 | 3 | 5 | Good |
| 3 | 15 kPa | 0 | 0 | 0 | 2 | 4 | Good |
| 4 | 17 kPa | 0 | 0 | 0 | 1 | 2 | Good |
| 5 | 20 kPa | 0 | 0 | 0 | 0 | 0 | Excellent |
| 6 | 30 kPa | 0 | 0 | 0 | 0 | 0 | Excellent |
| 7 | 40 kPa | 0 | 0 | 0 | 0 | 0 | Excellent |

In the Table 1, each measurement value shows a total number of lamps in which the cracks or the breakages occurred, among the 20 lamps. As can be seen from Table 1, no cracks or breakages occurred until the aging times reached 6000 hrs in the samples No. 2 to No. 7 having the filling pressure set to 13 kPa or more. Further, no cracks and breakages occurred until the aging times reached 12000 hrs in the samples of No. 5 to No. 7 having the filling pressure set to 20 kPa or more.

More specifically, Table 1 shows that the filling pressure set to 13 kPa or more allows 6000 hrs of a target rated lamp life to be ensured, and a rated lamp life can be extended by increasing the filling pressure. Therefore, the filling pressure can be set appropriately to 13 kPa or more. More specifically, the filling pressure can be set to 13.5 kPa or more or 14 kPa or more, or may be set to 22 kPa or more or 27 kPa or more.

It should be noted that the same result was obtained also by using the neon gas as the starting-assistance rare gas. As for an amount of Ar of the neon-argon penning gas, there is no limitation to 0.5% Ar. For example, it is preferable to set the amount in a range of 0.1% to 2.0%.

Figure 5:
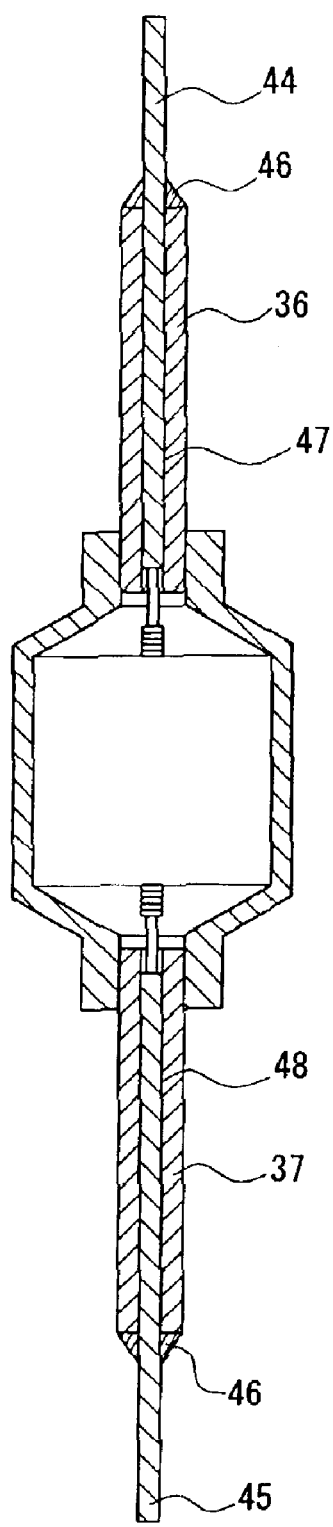
FIG. 5 is a cross-sectional view of another example of the conventional metal halide lamp having an alumina ceramic tube
Figure 6:
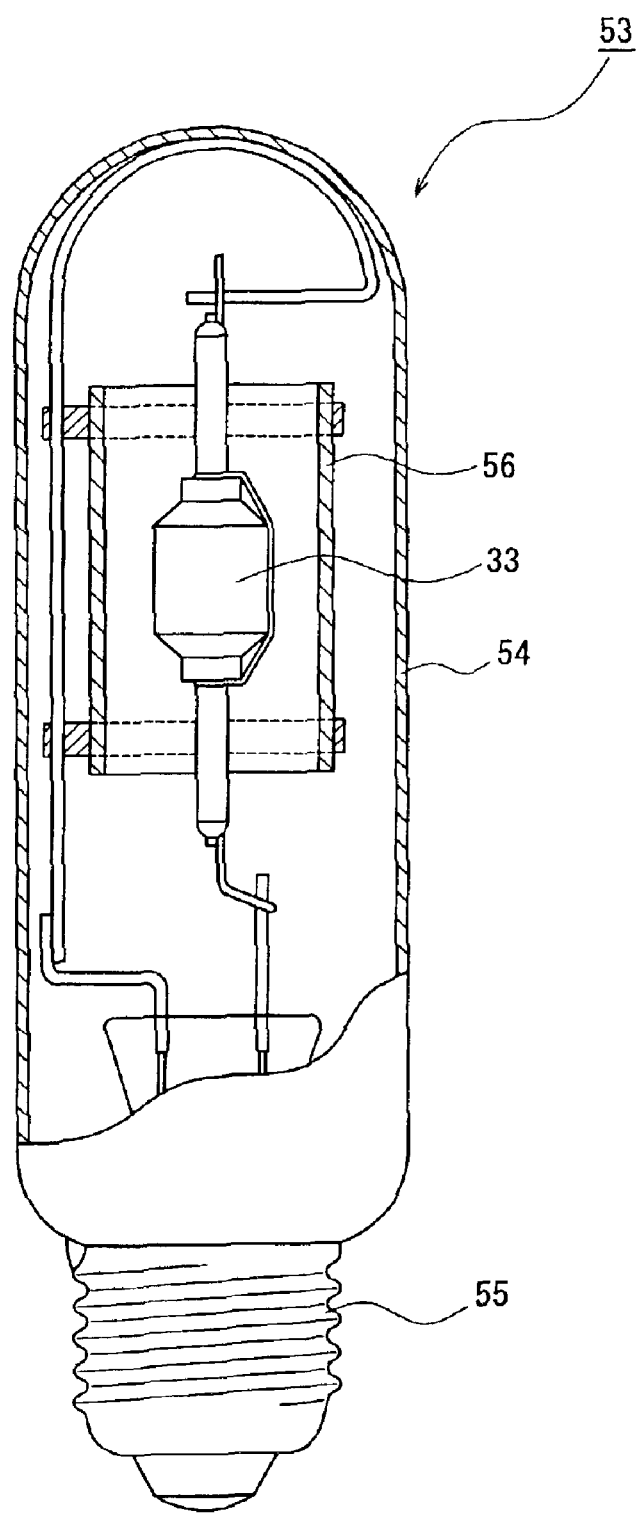
FIG. 6 is a view showing an overall configuration of the conventional metal halide lamp having an alumina ceramic tube.
Figure 7:
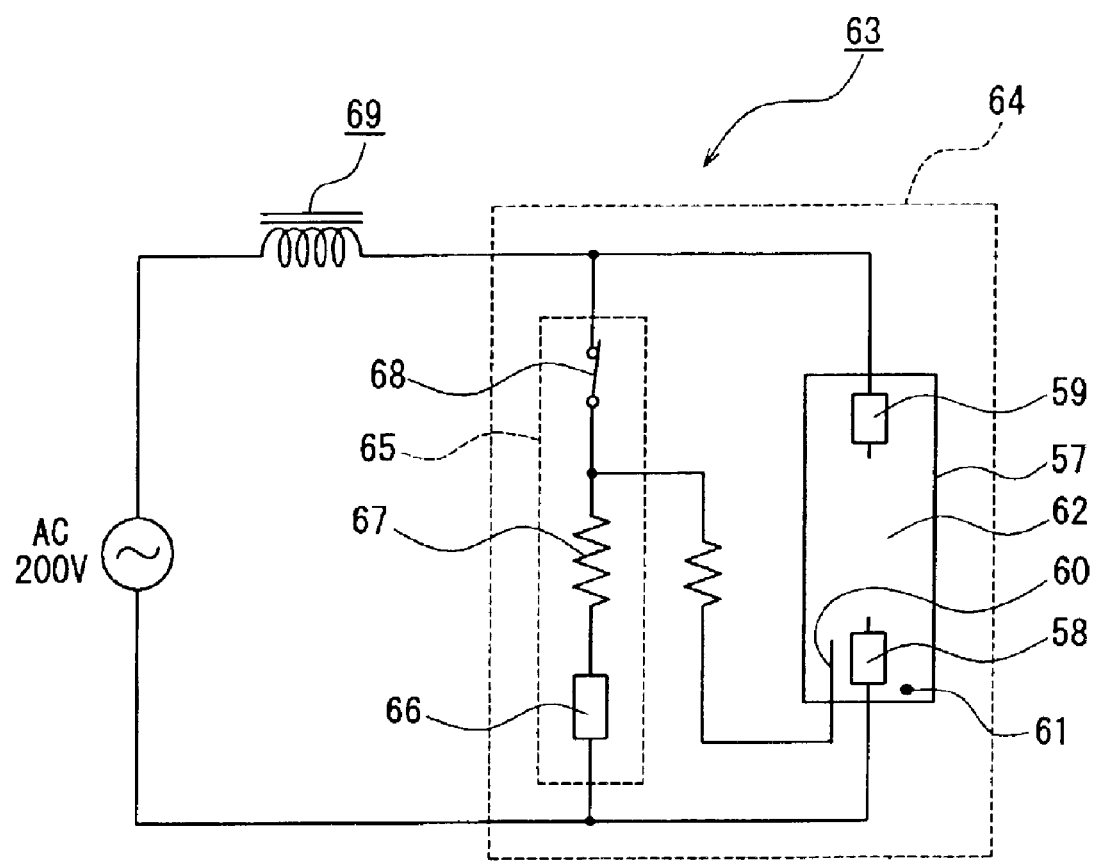
FIG. 7 is a view showing an example of a lighting circuit of the conventional metal halide lamp employing a quartz arc tube.

Further, the same measurement was conducted also for a lamp having an arc tube including the narrow tubes 4 and 5 of the same configuration as those in FIG. 5, and the other components were configured as shown in FIG. 1. Then, the cracks and the breakages were prevented from occurring in the narrow tubes as described above when the filling pressure of the neon gas or the neon-based gaseous mixture as the starting-assistance rare gas was raised to the above-mentioned range.

The above-mentioned effects of the present invention can be obtained since the increased filling pressure restrains the electrons and mercury ions produced in the cathode regions at the tip portions of the electrodes from diffusing to the spaces 17 and 18 in the rear portion of the electrodes at the beginning of starting of the lamp. Therefore, the effects of the present invention are not limited to the metal halide lamp. More specifically, it is considered that the effects of the present invention are achieved even in a mercury lamp or a sodium lamp as long as its arc tube is configured as shown in FIGS. 1 and 5.

Even in the lamp 23 in which the filling pressure of the neon gas or the neon-based gaseous mixture was increased, the starting property, the lamp properties of the lamp efficiency and the color rendering were sustained, thereby obtaining the same excellent properties as in the above-mentioned case where the filling pressure was set to 10.5 kPa. In the above-mentioned comparison example in which the starting-assistance conductor was not provided, the arc tube did not start with reliability. Therefore, a configuration with the starter and the starting-assistance conductor serves also for sustaining starting property described in the present embodiment.

The excellent starting property promotes arc discharge from the tip portions of the electrodes after the discharging starts. This can shorten discharging times in the molybdenum coils 19 and 20 in the rear portion of the electrode rods 8 and 9, thereby preventing a local temperature rise in the vicinity of the molybdenum coils 19 and 20. More specifically, the excellent starting property serves for preventing cracks and breakages, which results in the extended life.

Further, since the starter is provided in the outer bulb, the high intensity discharge lamp of the present invention can be lit even by a simple copper-iron type ballast having no pulse-generating function in itself, the ballast being used in a high intensity mercury lamp or the like. Therefore, the high intensity discharge lamp of the present invention is useful for a high intensity discharge lamp system in which the copper-iron type inductance ballast is employed for lighting. More specifically, the high intensity discharge lamp of the present invention is employed in a high intensity discharge lamp system provided with a power source, a ballast and a lamp, which results in requiring no pulse-generating function in components other than the lamp.

Further, the ballast is not limited to the copper-iron type inductance ballast. Since the starter is provided in the lamp itself, the high intensity discharge lamp of the present invention is useful also for a ballast having no pulse-generating function in itself.

Discharge can occur between components in a configuration in which the outer bulb contains the starter. However, the discharge in the outer tube can be prevented by filling the outer bulb with nitrogen as described above.

Further, the present embodiment is described with reference to an example of the discharge container in which the narrow tubes and the discharge arc tube are sintered to be joined. However, the same effect is obtained in a discharge container in which the narrow tubes and the discharge arc tube are formed integrally.

According to the present invention, a discharge arc can be prevented from jumping from the tip portions of the electrodes to the spaces formed by the electrodes, the power feeders and the inner surfaces of the narrow tubes, and also occurrence of the cracks and the breakages in the narrow tube can be avoided as described above. Therefore, it is possible to offer a high-efficiency and long-life high intensity discharge lamp, while the starting-operation voltage is low. Further, the high intensity discharge lamp can be lit by the conventional simple copper-iron type ballast that is used in a high intensity mercury lamp or the like.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A high intensity discharge lamp comprising an alumina ceramic arc tube having a discharge arc tube, alumina ceramic narrow tubes formed at both end portions of the discharge arc tube, wherein narrow tubes have smaller diameter compared to the diameter of the discharge arc tube, electrode rods and power feeders, the electrode rods and the power feeders being arranged to form spaces between the electrode rods, the power feeders and inner surfaces of the narrow tubes, wherein the alumina ceramic arc tube is arranged in an outer bulb, the outer bulb is provided with a starter therein, the starter comprising a switching element, the discharge arc tube is filled with a neon gas or a neon-based gaseous mixture as a starting-assistance rare gas, a filling pressure is set to 13 kPa or more, the high intensity discharge lamp is lit by being connected to a ballast having no pulse-generating function in the ballast itself, and a high voltage pulse is induced at the ballast due to interruption of current by the switching element of the starter so as to start the alumina ceramic arc tube.

2. The high intensity discharge lamp according to claim 1, wherein the filling pressure is set to 15 kPa or more.

3. The high intensity discharge lamp according to claim 1, wherein the filling pressure is set to 20 kPa or more.

4. The high intensity discharge lamp according to claim 1, wherein the filling pressure is set to 30 kPa or more.

5. The high intensity discharge lamp according to claim 1, wherein the neon-based gaseous mixture is a neon-argon penning gas.

6. The high intensity discharge lamp according to claim 1, wherein the alumina ceramic arc tube is arranged in the outer bulb, and the outer bulb is filled with a nitrogen gas therein.

7. The high intensity discharge lamp according to claim 1, wherein a starting-assistance conductor is provided along the discharge arc tube.

8. A high intensity discharge lamp system provided with the high intensity discharge lamp according to claim 1, wherein the high intensity discharge lamp is lit by a ballast having no pulse-generating function.

9. The high intensity discharge lamp according to claim 1, wherein the starting of the discharge lamp takes place without the assistance of an emitter material or a UV-generating apparatus.

* * * * *